United States Patent [19]

Hawes

[11] Patent Number: 4,745,575
[45] Date of Patent: May 17, 1988

[54] AREA FILLING HARDWARE FOR A COLOR GRAPHICS FRAME BUFFER

[75] Inventor: Adrian J. Hawes, Eastleigh, United Kingdom

[73] Assignee: International Business Machines Corporation, Armonk, N.Y.

[21] Appl. No.: 675,038

[22] Filed: Nov. 26, 1984

[30] Foreign Application Priority Data

Dec. 22, 1983 [EP] European Pat. Off. ........ 83307844.7

[51] Int. Cl.⁴ .............................................. G09G 1/00
[52] U.S. Cl. .................................... 364/900; 340/744
[58] Field of Search ...................... 340/728, 729, 747; 364/900 MS File, 200 MS File, 518, 521

[56] References Cited

U.S. PATENT DOCUMENTS

| 4,189,743 | 2/1980 | Schure et al. | 340/747 |
| 4,396,989 | 8/1983 | Fleming et al. | 364/719 |
| 4,481,594 | 11/1984 | Staggs et al. | 340/701 |
| 4,528,642 | 7/1985 | Waller | 340/747 |
| 4,591,850 | 5/1986 | Lundström | 340/799 |
| 4,626,838 | 12/1986 | Tsujioka et al. | 340/728 |

FOREIGN PATENT DOCUMENTS

| 0005034 | 10/1979 | European Pat. Off. . |
| 0019045 | 11/1980 | European Pat. Off. . |
| 0095618 | 7/1983 | European Pat. Off. . |

OTHER PUBLICATIONS

IEEE Transactions on Computers; vol. C-30, No. 1, Jan. 1981, pp. 41–48, IEEE, New York, U.S.; B. D. Ackland et al.: "The Edge Flag Algorithm–A Fill Method for Raster Scan Display", *pp. 42–44, paragraph III, Edge Fill.

Applicants' Description of FIG. 1, p. 3 of present application, lines 1–3; also FIG. 1.

Primary Examiner—Raulfe B. Zache
Assistant Examiner—Michael J. Ure
Attorney, Agent, or Firm—Frederick D. Poag; Joseph J. Connerton

[57] ABSTRACT

A graphics display apparatus includes a raster-scanned CRT refreshed from a bit-for-pel refresh buffer loaded with bit patterns by a microprocessor corresponding to a desired image. To display shaded areas, additional control logic draws an outline of the area in an auxiliary memory, preferably using Bresenham's Algorithm, according to specified rules. Edge filling logic consisting of EXCLUSIVE-OR gates is used to draw the filled area in the refresh buffer as the outline is read from the auxiliary memory into the refresh buffer. This hardware assistance by the control logic and edge fill logic to the microprocessor enables complex areas to be drawn and filled without unduly degrading the performance of the microprocessor.

3 Claims, 7 Drawing Sheets

FIG.9 ated. The embodiment shown in FIG. 2 will now be de-

AREA FILLING HARDWARE FOR A COLOR GRAPHICS FRAME BUFFER

BACKGROUND OF THE INVENTION

This invention relates to a graphics display apparatus incorporating a graphics processor and a bit-per-pel refresh buffer.

The invention is particularly useful in a display apparatus incorporating a color cathode ray tube in which three planes of refresh buffer contain red, blue and green bit patterns. The refresh buffer is periodically scanned by refresh logic to produce bit streams that turn the red, green and blue electron beams on and off as they are raster scanned across the screen of the CRT. The bit pattern stored in the refresh buffer is loaded therein under control of a graphics processor which is a mixture of hardware and software.

Early graphic display apparatus were usually driven from large central processing units but more modern graphics displays employ microprocessors. The use of software routines generally slows down the creation of the bit patterns in the refresh buffer and, although this was not previously a problem with large processors (because of their processing speeds), it is a problem when using less powerful processors to drive the displays. To this end it has previously been proposed to employ special purpose or dedicated hardware to assist in the drawing of vectors and arcs in the refresh buffer.

SUMMARY OF THE INVENTION

An object of the present invention is to provide a graphics display apparatus in which hardware is provided to assist the graphics processor to fill or shade complex areas in the refresh buffer.

According to the invention, a graphics display apparatus comprises a raster-scanned cathode ray tube display, a graphics processor for providing bit patterns corresponding to a desired graphics image to be displayed on said cathode ray tube, and a bit-per-pel refresh buffer for containing bit patterns provided by said graphics processor to refresh the cathode ray tube, and is characterized in that said apparatus further comprises an auxiliary memory for containing a bit pattern representing an area to be displayed on the cathode ray tube and control logic operable in response to said graphics processor to load into said auxiliary memory a bit pattern representing the outline of the area to be displayed and thereafter operable to read bytes of data from said auxiliary memory to said refresh buffer whilst adding bits to fill the outline with a desired pattern.

DESCRIPTION OF THE PREFERRED EMBODIMENT

Figure 1:
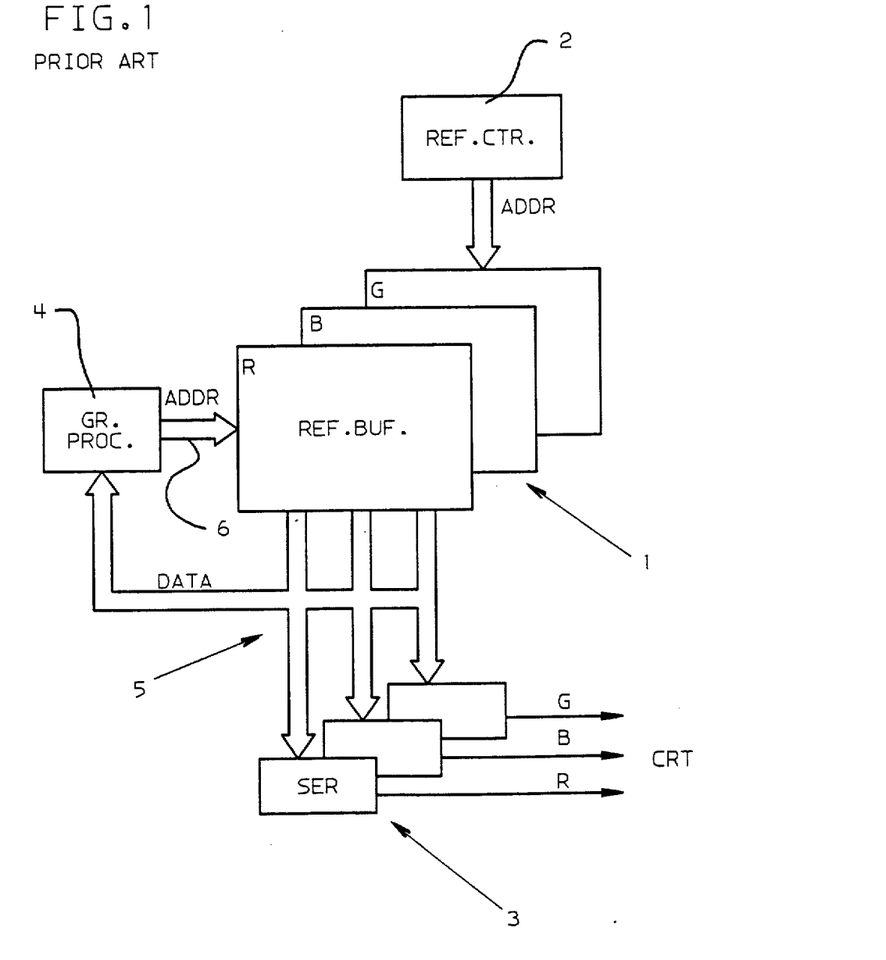
FIG. 1 is a simplified data flow of a typical refresh buffer arrangement for a color cathode ray tube graphics display.

Although not limited to its use in a graphics display employing a color CRT, the invention is particularly advantageous when so used and will therefore be described in terms of a color cathode ray tube. FIG. 1 shows the main elements of a typical graphics display employing a CRT in which the CRT is refreshed from a bit-for-pel refresh buffer 1 consisting of three planes R, B and G. Each picture element (pel) on the screen is represented by three bits (one for each of the three primary colors) which control whether the electron beams of the CRT are turned on or off as they scan the CRT screen. The refresh buffer 1 can be mapped or unmapped: if it is mapped, arbitration logic will be used to resolve conflicts between screen refresh access and processor access. The buffer can be constituted by static or dynamic semiconductor random access memory (RAM). More bits can be assigned to each pel as necessary for display attribute purposes.

Refresh logic including a refresh counter 2 periodically addresses the refresh buffer 1 and its contents are read byte-by-byte into serializers 3 which supply a serial bit pattern as the red, blue, green (R, B, G) video signal to the CRT.

The bit patterns stored within the refresh buffer 1 are loaded therein under the control of a graphics processor 4 along data bus 5 to addresses specified on address buses 6. The graphics processor 4 would normally nowadays be constituted by a microprocessor operating under program control. It creates and manipulates the bit patterns required to display a required image. Although in theory it can create any image, in practice complex images require a large amount of computation or manipulation and accordingly, as mentioned above, hardware assistance has been proposed to speed up the drawing of lines and arcs.

Figure 2:
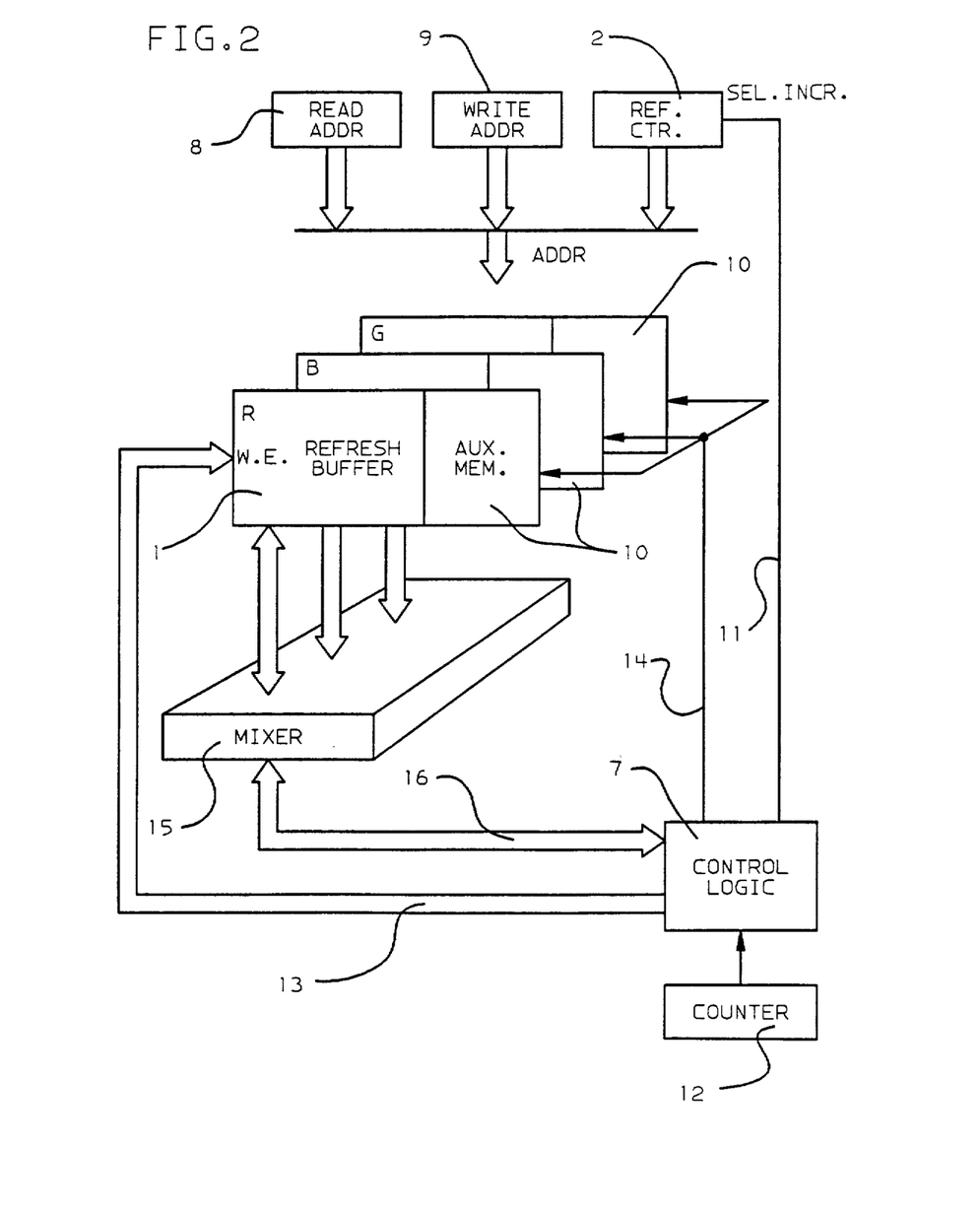
FIG. 2 shows a preferred embodiment of the invention in which hardware draws the outline of an area to be filled in auxiliary storage and then writes this outline into the refresh buffer whilst filling the outlined area.

FIG. 2 serves to illustrate the invention in which hardware is provided to improve the speed of drawing areas and filling those areas with a desired color or shading. Not shown in FIG. 2 are the serializers 3 and graphics processor 4 of FIG. 1, since these remain substantially unaltered, although the graphics processor now interfaces directly with the control logic 7 and address counters 8 and 9. An extra auxiliary memory 10 is provided in addition to the refresh buffer 1. At least one display area's worth of extra storage is required although, as shown in FIG. 2, this may be spread across the three color planes. In FIG. 2, each of the three planes provides one third of the total extra storage required. In many cases the extra storage costs no more in RAM modules as the sizes of the commercially-available RAMs are often larger than is actually required for the display refresh buffer. For example, a typical commercial RAM module is $64K \times 1$ bit ($K = 1024$) and these modules are usually wired in groups of 8 for ease of interfacing to an 8-bit processor. For a $720 \times 512$ pel display only 45K×8 bits are required for a color plane. Thus twenty four 64K×1 RAMs provide all the storage that is required for the three 45K×8 refresh buffers (one for each color) and, in addition, a further 57K×8 bits of storage which can be used for the auxiliary memory 10.

In addition to the refresh counter 2 used to address the refresh buffer 1, two address counters 8 and 9 are provided. Address counter 9 contains the "WRITE" address and is used to scan the display area, that is, refresh buffer 1 and also the auxiliary area 10 when drawing (writing) an outline. Address counter 8 contains the "READ" address and is used to scan the auxiliary area 10 when reading the drawn outline for the area fill operation. The read and write addresses may share the same Y component, that is, they access the same raster scan line. Buffer 1 and auxiliary memory 10 are addressed a byte at a time during the READ and WRITE cycles.

Control logic 7 operates under control of the graphics processor (not shown in FIG. 2) and normally performs consecutive "READ/WRITE" cycles, incrementing the address counters 8 and 9 by means of line 11 and decrementing counter 12 at the end of each cycle. The "WRITE" operation is controlled by WRITE ENABLE bus 13. This is an 8-bit bus which indicates which bit(s) in a byte is(are) to be written to. Thus if all bits in this bus are "on", then all bits in the addressed byte will be written. If only one bit is "on", then only that bit in the byte will be altered, the others retaining their previous value. A typical implementation is to connect each bit of the bus 13 to the WRITE ENABLE input of an industry standard 2164 64K×1 RAM that makes up this bit of the memory. One WRITE ENABLE bus bit is connected to 3 memories, one for each plane. The control logic 7 determines which planes are read and written, under control of the graphics processor, by means of plane select lines 14. Consecutive READ/WRITE cycles continue until the counter 12 reaches zero: the counter 12 stops the operation at the end of the raster scan line where the auxiliary memory area 10 crosses planes.

Data are read from and written to the memory 10 and buffer 1 by control logic 7 through a multiplexor or mixer 15 and data bus 16. In operation, as will be described in more detail below, the graphics processor causes the control logic 7 to draw the outline of the area to be filled in the auxiliary memory 10, splitting the area as necessary across the three planes. Each raster line in the auxiliary memory 10 is scanned a byte at a time by the control logic 7 and the corresponding byte in the refresh buffer area 1 is written with the pattern corresponding to the interior of the area outlined in the auxiliary area 10. As the scan proceeds across the area, the WRITE cycles will leave a trail of a pattern in the display refresh buffer 1. The counter 12 can be loaded, by the graphics processor, at the beginning of each scan line with the maximum width area to be filled so that scanning can terminate soon after the last boundary is encountered.

As will be explained in more detail below, the outline of the area to be filled is always drawn in the auxiliary memory 10 such that each scan line contains only an even number of boundary pels to simplify the bit adding logic. On any scan line intercepting an area, each part of the area to be filled is defined by two boundary bits and the bit-adding logic adds bits between the first and second bits, the third and fourth bits (if any) etc.

Figure 3:
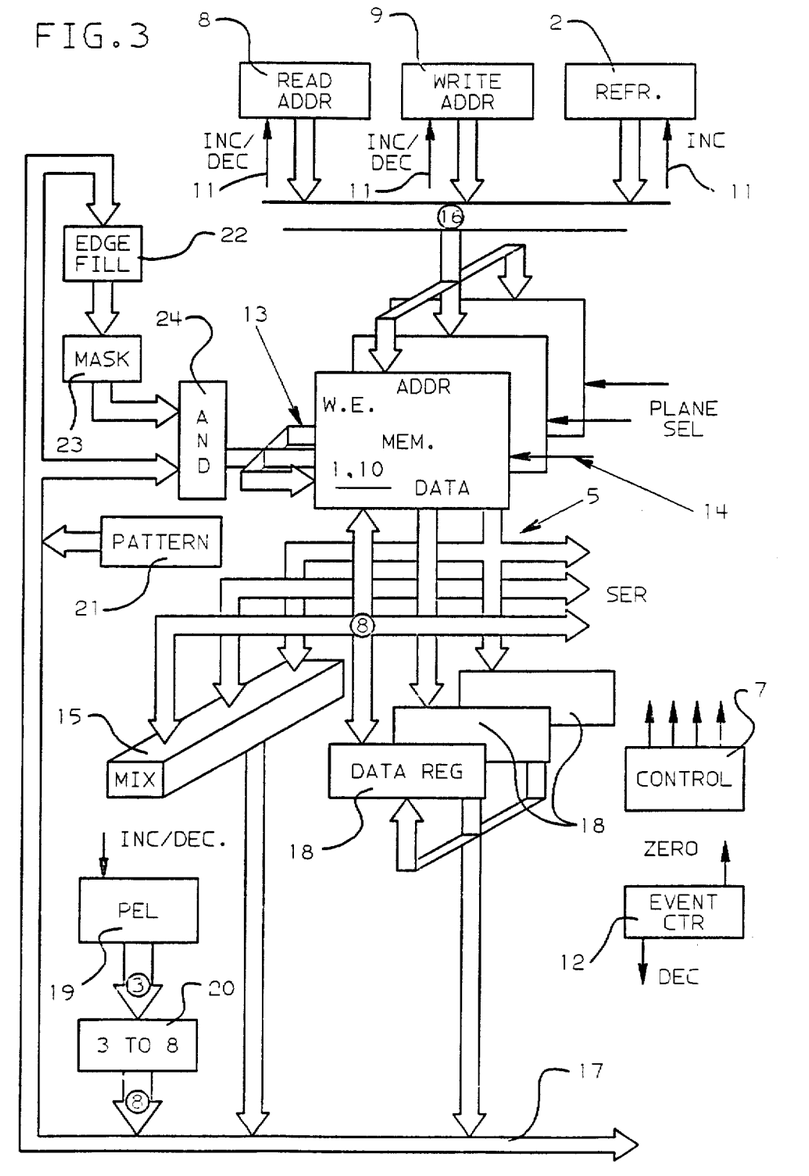
FIG. 3 is a data flow diagram showing the preferred embodiment in more detail.

FIG. 3 shows the graphics bit buffer data flow in more detail. To avoid unnecessary detail, the graphics processor and serializers, of FIG. 1 are not shown, but in practice the graphics processor would be connected to the 8-bit wide internal data bus 17 and the serializers would be connected to 8-bit wide data bus 5. In FIG. 3, similar parts have been given the same reference numerals as the equivalent parts in FIG. 2. It will be appreciated, however, that FIG. 3 is a data flow diagram so there is no one-for-one relationship with FIG. 2.

Data to be stored in refresh buffer 1 or auxiliary memory 10 are held in data registers 18 and are stored at the address specified by address register 9 under control of the 8-bit Write Enable (WE) lines 13 and plane select lines 14.

Pel counter 19 is a 3-bit counter defining the pel within a byte that is to be written when drawing the area outline. 3-line-to-8-line converter 20 serves to convert the pel value into an 8-bit byte which will contain a 1 bit at the bit position representing the pel to be drawn. A pattern register 21 is an 8-bit register which defines a repeating shading pattern for the interior of the area. Along with 3-to-8 converter 20 and mixer 15, its output may be selectively gated onto internal data bus 17. Edge fill logic 22, shown in detail in FIG. 5 below, adds 1 bits between edge-defining bits in bytes received from auxiliary memory 10 along bus 17 under control of control logic 7. The output of the edge fill logic 22 is loaded into a mask register 23. The contents of the mask register 23 are ANDed with the internal data bus 17 which at this time will contain the value stored in pattern register 21 (the contents of the pattern register serving to define, for example, transparent parts in the shading to be filled into the area) in AND gates 24 whose outputs constitute the Write Enable lines 13.

Pels to be written in auxiliary memory 10, are indicated by pel counter 19 and write address 9. By previously loading the mask 23 with all "ones", each required pel of the outline is written by means of the Write Enable bus 13. Writing pels in Exclusive-OR mode is achieved by first reading out the byte stored at the WRITE address indicated by register 9 into data registers 18 and then writing the inverse of that byte back to the same address under control of WRITE ENABLE bus 13. For this operation the inverted outputs of data registers 18 are passed to the memory. Lines 14 are used to select the desired planes.

Figure 4:
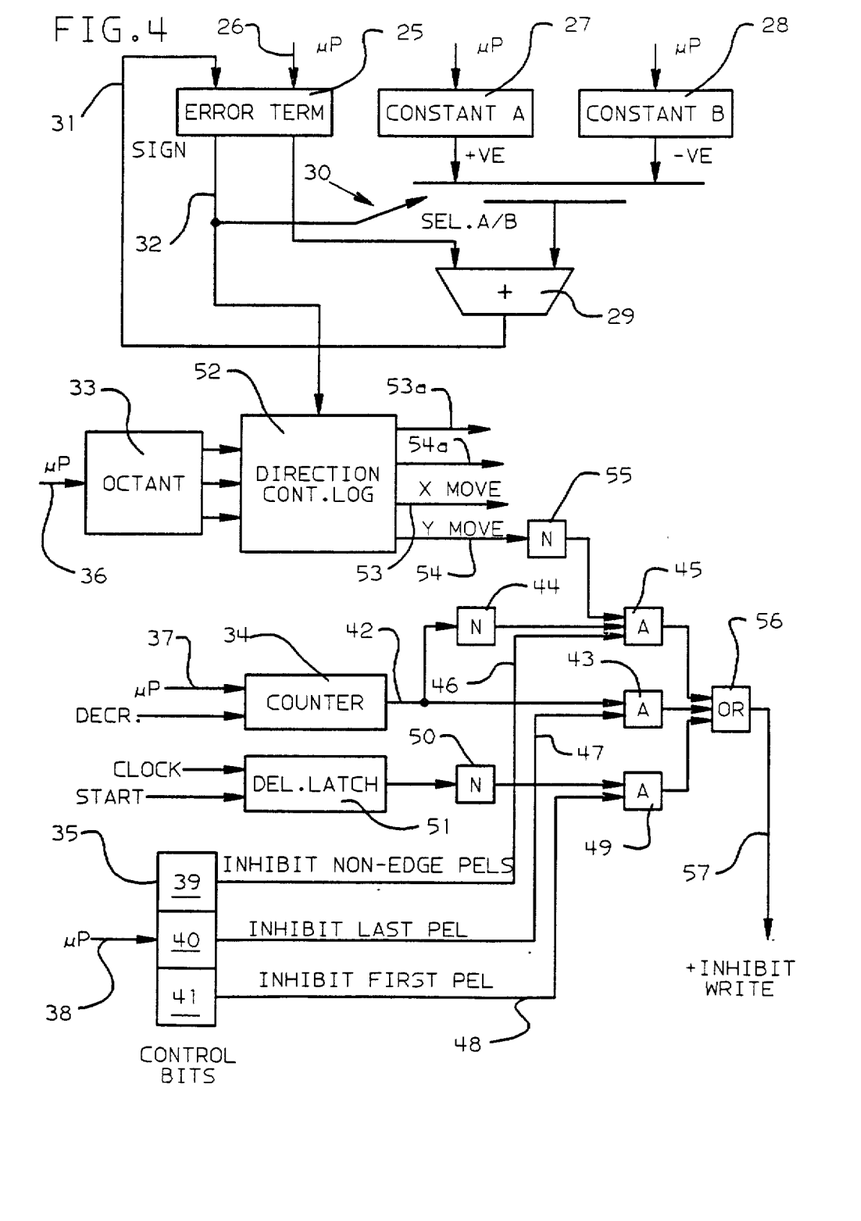
FIG. 4 is a block diagram of control logic for drawing the outline of an area to be filled.

FIG. 4 shows details of the outline drawing logic contained within control logic 10, FIGS. 2 and 3. The line drawing logic is based on the use of Bresenham's algorithm. Bresenham's algorithm is described in detail in "Algorithm for computer control of a digital plotter", J. E. Bresenham, IBM Systems Journal, Vol 4, No 1, 1965, pp 25–30. Briefly, it plots the points which approximate to the ideal straight line between two points. Only two moves are allowed, either along the diagonal to the next point or vertically/horizontally (depending on slope of line) to the next point. An account of the error term, the distance of the current point from the ideal line, is maintained and the move is made which keeps the error term at a minimum.

In FIG. 4, register 25 contains the error term: it is initialised on lines 26 at the beginning of each line drawing operation by the graphics processor which is suitably constituted by a microprocessor such as an Intel 8051. Registers 27 and 28 are loaded at the beginning of each line drawing position with signed constants A and B which have positive and negative values respectively.

These constants depend upon the slope of the line being plotted (and the pitch of the picture elements) and are computed by the microprocessor. Adder 29 adds the current error term from register 25 to constant A in register 27 or constant B in register 28 in accordance with selector 30. Constant A is used if the next move is along a diagonal; constant B is used if the move is along the X or Y axis. The output of the adder is loaded into the error term register 25 along line 31. Output 32 of register 25 indicates the sign of the error term.

Figure 7:
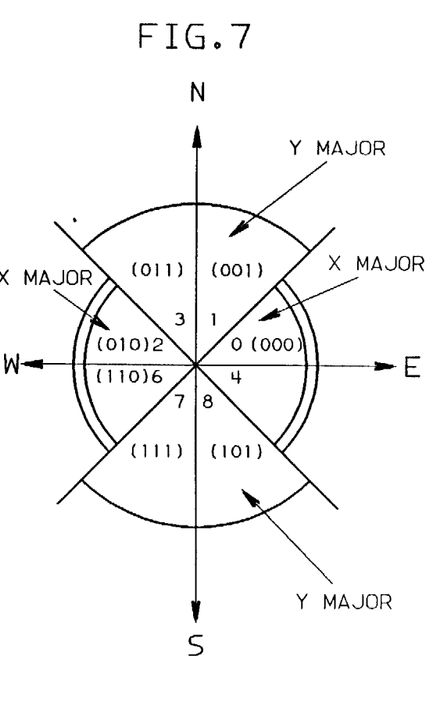
FIG. 7 illustrates various directions and octants.

At the beginning of each line (vector) drawing operation, the microprocessor constituting the graphics processor 10 loads the registers 33, 34 and 35 along lines 36, 37 and 38 respectively. Register 33 contains a 3 bit number indicative of the octant in which the line is being plotted. (The eight octants are shown in FIG. 7). The 3 bits that make up the octant number correspond to the sign of the Y value of the line, the sign of the X value and whether the line is X or Y major. Counter 34 is loaded with a count representing the length of the line in pels and is decremented as each point is plotted (note that a vector which crosses a plane boundary in auxiliary memory 10 must be split into two vectors, using standard clipping algorithms, before being drawn by this hardware). Register 35 has three stages 39, 40 and 41 which are loaded with control bits. The control bit in stage 39 is used to inhibit non-edge pels; that in stage 40 is used to inhibit the last pel and that in stage 41 is used to inhibit the first pel (excluding prior inhibited pels).

Output 42 of counter 34 assumes a logic '1' when the counter reaches zero and is connected to an AND gate 43 and through an inverter 44 to an AND gate 45. Outputs 46, 47 and 48 of register stages 39, 40 and 41 respectively are connected to AND gates 45, 43 and 49 respectively. The other input of AND gate 49 is derived from an inverter 50 connected to a delay latch 51 whose purpose is to indicate the first pel. The clock for this latch is activated when the first edge-defining pel is encountered (as indicated by the output of AND gate 45).

Direction control logic 52 receives octant information from register 33 and the sign of the error term in register 25 along lone 32 and computes the next move. Its outputs 53, 53a, 54 and 54a indicate respectively whether the next move involves an X move, and if so whether this move is in the +ve or -ve direction, and/or a move in the Y direction, and if so, the polarity of this move. Output 54 is connected to inverter 55 whose output constitutes a third input to AND gate 45. The outputs of AND gates 43, 45 and 49 are connected to OR gate 56 whose output 57 is used to inhibit writing of certain bits otherwise determined by the Bresenham algorithm to be a plot of the area boundary line.

Figure 5:
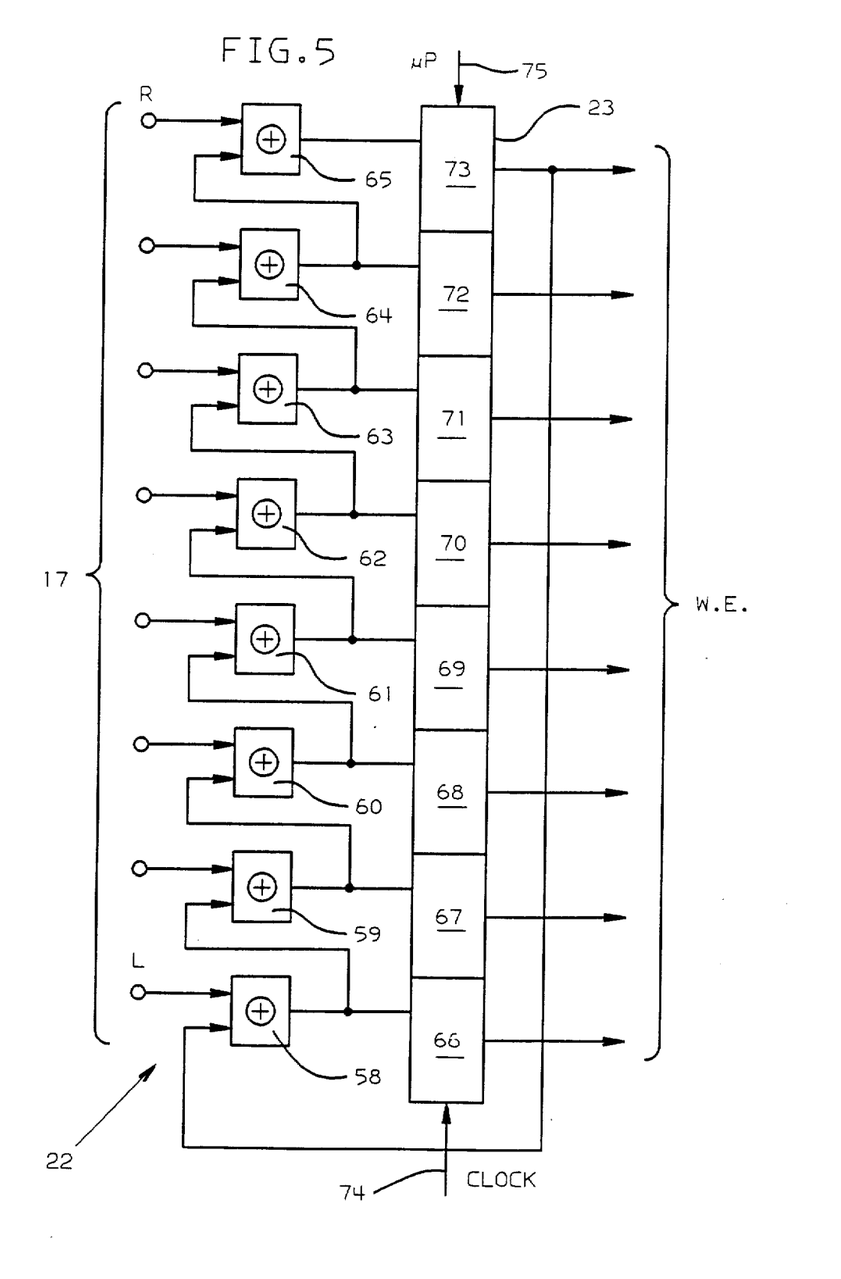
FIG. 5 shows the edge fill logic.

The purpose of the inhibit logic shown in FIG. 4 is to ensure that the boundary line plotted in the auxiliary memory 10 is unambiguous to the edge fill logic 22, FIG. 3, shown in detail in FIG. 5. The following four rules are observed. Firstly, non-edge defining pels are inhibited. Secondly, all vectors are drawn towards the left as viewed on the screen, hereinafter termed westwards. Thirdly, the lowest (hereinafter called southernmost) pel is inhibited. Fourthly, the pels are drawn in Exclusive-OR mode. The direction control logic 52 is arranged to draw all X major lines (see FIG. 7) in a generally westward direction and may have to reverse certain lines to obey rule 2. Rules 1 and 2 need not be exercised on Y major lines. After any reversal to conform to rule 2, rule 3 may be effected by inhibiting the first pel if the line is being drawn upwardly as viewed on the screen (northward) or the last pel if it is being drawn southward. Rules 3 and 4 above ensure that locally northernmost maxima and southernmost minima are not plotted; minima are not plotted at all and maxima are plotted twice, thus disappearing under the EX-OR rule 4.

FIG. 5 shows the edge fill logic 22 of FIG. 3 in more detail. Eight EXCLUSIVE-OR gates 58 to 65 are connected with their respective outputs connected to the eight stages 66 to 73 respectively of mask register 23. The EX-OR gates 58 to 65 receive the bytes read from the auxiliary memory 10 along bus 17. The bit received at EX-OR gate 58 represents the left-most bit in the byte and the bit received at EX-OR gate 65 represents the right-most bit in the byte. Each EX-OR gate except gate 58 receives as its other input the output of the EX-OR gate corresponding to the immediately left bit position. EX-OR gate 58 receives as its other input the output of mask register stage 73. The outputs of the mask register 23 (ANDed with pattern register 21) are used to Write Enable the refresh buffer 1. Clock pulses on line 74 are used to load the output from the edge fill logic into the mask register 23. The mask register is of the edge-triggered or master-slave variety so that the output of each latch does not change until the input data has been gated off. Line 75 is used by the graphics processor to initialise the register, that is, insert all zeros, at the beginning of each scan line.

As each byte is received from the auxiliary memory 10, the edge logic 22 will add bits to the bit positions to the right of any left boundary representing bit position. It will continue to add bits to successive bits until the next non-zero byte is received when bits will be inserted up to the right boundary representing bit. No more bits will be inserted until another non-zero byte (if any) is received on that scan line at which point the logic will again begin to insert bits into the mask register to the right of the boundary-defining bit.

It will be appreciated that there must be an even number of boundary defining bits on each scan line since otherwise the logic will add bits to the end of the scan line. Similarly each boundary must be represented by only one bit since otherwise a gap would be left in the filled area. When copying from one part of the refresh buffer to another, the EXCLUSIVE-OR gates can be turned off. In a modification, not shown, the control logic 7 can incorporate a zero-byte detector to enable it quickly to scan the auxiliary memory 10 outside the area boundary, thus avoiding the need to write empty bytes from the auxiliary memory 10 into the refresh buffer 1.

Figure 6:
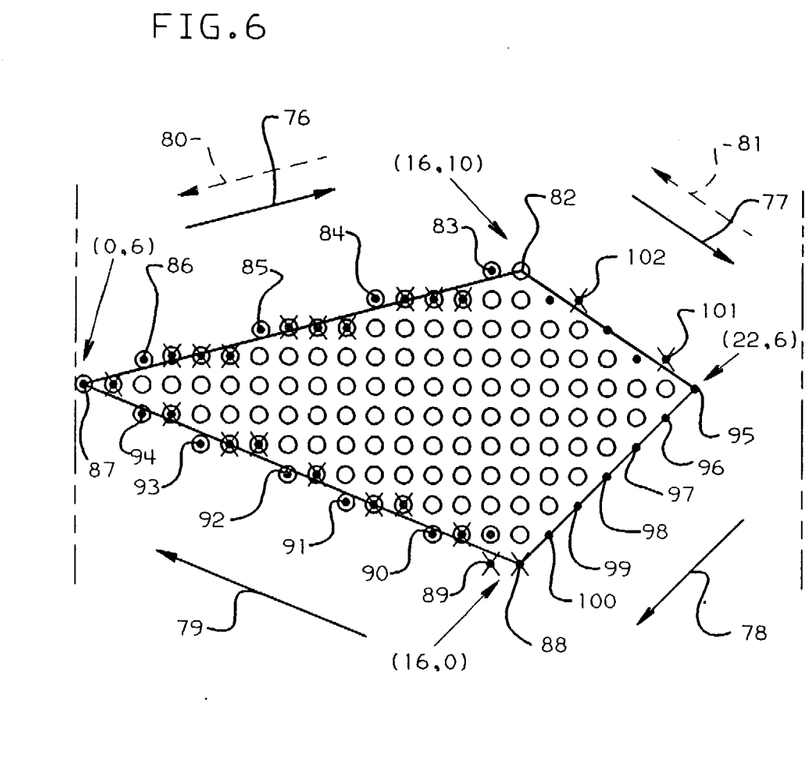
FIG. 6 shows how a diamond-shaped area is drawn and filled and serves to illustrate the line drawing and area filling rules.

FIG. 6 shows how a diamond shaped area is drawn and filled and illustrates the line drawing and area filling rules. In FIG. 6, it is desired to fill a diamond drawn between the points (0,6), (16,10), (22,6) and (16,0). The ideal lines between these points are shown in FIG. 6 as solid lines. However, since the display is a raster scan display, only a matrix of points can be addressed. The dots in FIG. 6 represent the approximation to the ideal lines produced using Bresenham's Algorithm. However, as explained above, certain bits are inhibited and these are represented by the dots with crosses.

Although the lines have been shown as being required by the graphics processor to be drawn in the directions of the solid arrows 76 to 79, the lines 76 and 77 joining the points (0,6) to (16,10) and (16,10) to (22,6) are X major lines and the second rule stipulated above requires that they are computed in a direction which is generally westward, that is, in the directions indicated by dashed arrows 80 and 81. The outline represented by the uncrossed dots is stored in the auxiliary memory 10 as a series of 8-bit bytes, the chained lines representing the byte boundaries.

The drawing of the vectors represented by arrows 80, 79, 78 and 81 will be described in more detail to illustrate the effect of the rules. In the vector represented by the arrow 80, point 82 is inhibited since it is not an edge defining pel. Point 83 is plotted as the first (edge defining) pel. Similarly points 84, 85 and 86 are plotted as edge defining pels, the points to the right of them being inhibited as non-edge defining points. Point 87 is inhibited whilst drawing vector 80, it being the last pel and therefore the most southerly of the vector (the vector being drawn in a southerly direction).

During plotting of the vector represented by arrow 79, pel 88 is inhibited as a non-edge pel and pel 89 is inhibited as the first (edge defining) pel and therefore the most southerly (the vector being drawn in a northerly direction). Pels 90 to 94 are plotted but the pels to the right of them are inhibited as non-edge defining pels. However, pel 87 is plotted for vector 79 since it is not the most southerly for that vector.

Whilst plotting vector 78, pels 95 to 100 are plotted but pel 88 is again inhibited, this time being the most southerly. Plotting of vector 81 in accordance with the rules will not cause an additional writing of pel 95 (since it is the most southerly) so it will remain in the auxiliary memory 10 and will not be removed by the Exclusive-OR rule. Pels 101 and 102 are inhibited as non-edge defining pels. Pel 82 (previously inhibited as a non-edge defining pel during plotting of vector 80), will be plotted as the last pel of vector 81.

To fill the area, the various bytes are read in turn and supplied to the edge fill logic 22. The circles shown in FIG. 6 represent the bits inserted in each scan line and presented to the mask register 23. On the CRT screen, the desired pattern or shading will be inserted in the manner specified by the mask and pattern register bytes.

FIG. 7 illustrates the North, South, East and West directions, N, S, E and W, the X major directions and the Y major directions. Also shown in FIG. 6B are the eight octants 0 to 7 with the equivalent 3-bit octant number. Those skilled in the art will appreciate that where the raster scan is up and down rather than left to right, the rules above with respect to inhibiting the southernmost pels and drawing X major lines in a westwardly direction would need modification so that the Y major lines are drawn against the direction of scan and either the most easterly or the most westerly pels are inhibited depending on whether the scan was from top to bottom or from bottom to top.

Figure 8:
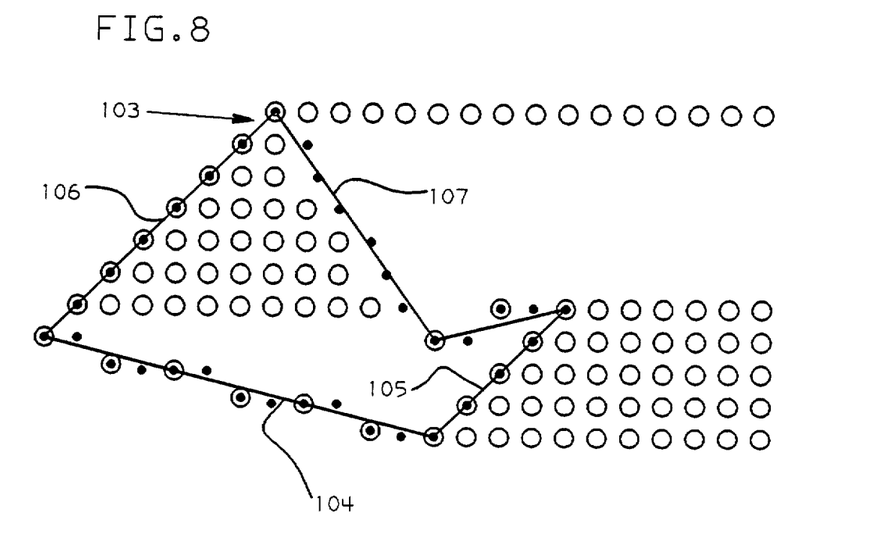
FIG. 8 shows the effect of not inhibiting certain bits representing the area outline during the subsequent area fill operation.

FIG. 8 shows some of the problems encountered if the inhibition rules are not followed. Thus the single bit (a local maxima referred to above) at point 103 would produce a succession of pels because there would be no edge defining bit to stop the insertion of bits. The X major line 104 with its non single bit boundary would not cause filling of the inside of the area whereas the bits representing boundary line 105 would lead to shading outside the area.

Figure 9:
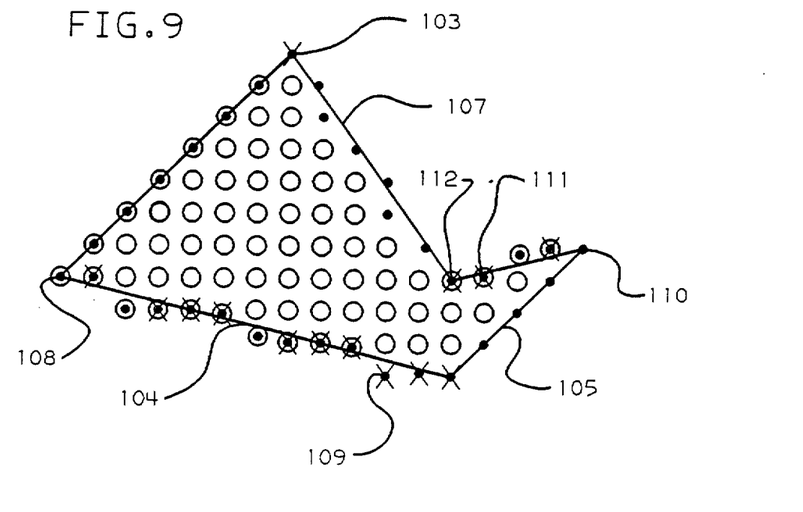
FIG. 9 shows the area of FIG. 8 in which certain outline bits are inhibited to overcome the problem shown with reference to FIG. 8.

FIG. 9 shows the same shaped area but with certain bits inhibited in the outline. Pel 103 is drawn twice (whilst plotting lines 106 and 107) and is therefore inhibited by the Exclusive-OR rule. Vector 104 is represented only by edge-defining pels and includes pel 108 which is inhibited during plotting of vector 106. Pel 109 is inhibited as the southernmost edge-defining pel of vector 104. Point 110 is drawn on the first point of vector 105. Point 111 is inhibited as a non-edge pel and point 112 is inhibited on the southernmost pel. With those bits inhibited, the edge following logic will fill the area correctly as shown. It will be realised that the areas shown in FIGS. 8 and 9 are not shown to scale and the resolution of the actual display would be such that the non-ideal boundary would not in practice be observed by the display terminal operator.

Although Bresenham's Algorithm is preferred since it requires only simple shifting or addition and no complex multiplication or division and is therefore well within the capacity of a small microprocessor, other line drawing algorithms could be employed. Although a series of EXCLUSIVE-OR gates has been shown for filling the bit pattern, a microprocessor could also be employed to perform this function.

The invention has been described in terms of a graphics processor constituted by a single microprocessor. In practice it may be desirable to employ two microprocessors for graphics functions, a relatively large one such as the Intel 8088 being used for performing high-level graphics commands such as the scale, rotate and 3D transformations and a relatively small one such as the Intel 8051 being used for the relatively slower tasks such as line drawing and area filling. Thus certain tasks would be released by the larger microprocessor to the smaller processor which in turn would release the outline drawing and area filling to the hardware logic assistance described, thus allowing the smaller processor to perform other "housekeeping" tasks.

I claim:

1. A graphics display apparatus comprising a raster-scanned cathode ray tube display, a graphics processor for providing bit patterns corresponding to a desired graphics image to be displayed on said cathode ray tube, a bit-per-pel refresh buffer containing bit patterns provided by said graphics processor to refresh said cathode ray tube, an auxiliary memory for containing a bit pattern representing the outline of an area to be displayed on said cathode ray tube, and control logic responsive to said graphics processor to load a bit pattern representing the outline of the area to be displayed into said auxiliary memory and thereafter read data from said auxiliary memory to said refresh buffer while adding bits to fill said outline of said area with a desired color pattern, said control logic including means for EXCLUSIVELY-ORing successive bits of said bit pattern read byte-by-byte from said auxiliary memory to thereby provide data representing said filled area.

2. Apparatus as claimed in claim 1 in which said data representing said filled area is loaded into a mask register used to control loading of specified image data into said refresh buffer.

3. Apparatus as claimed in claim 2, further including a pattern register for containing data representing a specified pattern, and a comparator connected to receive the outputs of said mask and pattern registers, the output of said comparator being connected to enable writing of data into an address of said refresh buffer specified by an address register connected to said control logic.

* * * * *